A. B. SMITH & S. OSBORN.
Saw-Sets.

No. 136,777. Patented March 11, 1873.

Witnesses:
E. M. Bates.
George E. Upham.

Inventors:
Augustus B. Smith,
Samuel Osborn
Chipman Hosmer & Co
Attys

UNITED STATES PATENT OFFICE.

AUGUSTUS B. SMITH, OF CHAMBERSBURG, PENNSYLVANIA, AND SAMUEL OSBORN, OF TRENTON, NEW JERSEY.

IMPROVEMENT IN SAW-SETS.

Specification forming part of Letters Patent No. 136,777, dated March 11, 1873.

*To all whom it may concern:*

Be it known that we, AUGUSTUS B. SMITH, of Chambersburg, Franklin county, Pennsylvania, and SAMUEL OSBORN, of Trenton, in the county of Mercer and State of New Jersey, have invented a new and valuable Improvement in Saw-Sets; and we do hereby declare that the following is a full, clear, and exact description of the construction and operation of the same, reference being had to the annexed drawing making a part of this specification and to the letters and figures of reference marked thereon.

Figure 1:
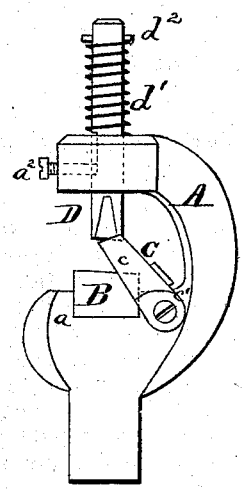
Figure 2:
Figure 3:
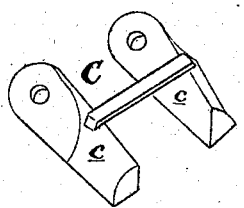

Figure 1 of the drawing is a side elevation of our improved saw-set. Fig. 2 is a front elevation of the plunger. Fig. 3 is a perspective of the gage.

Our invention has relation to saw-sets; and the novelty consists in the construction and combination of parts hereinafter more fully described and claimed.

In the drawing, A represents the frame, made of cast metal. We have shown it with a squared lower section, by which it may be secured in a vise; or it may be made with a tapped screw-hole or other device for securing it to a bench. The frame is recessed at *a* to receive a die, B, which is made of steel, and formed with an upper horizontal and beveled surface, as plainly shown in the drawing. This die fits snugly in the recess, and is held firmly in place between the arms *c* of the gage C, a detached view of which is shown in Fig. 3. The gage is secured in position to the frame by means of screws *c'*.

When it is desired to adjust this gage so as to regulate the distance which the saw shall be pushed in upon the die, according to the fineness or coarseness of the teeth, the screws *c'* are loosened and the gage turned as required. When the required adjustment is effected the screws are tightened, retaining the gage in place. D is the plunger, which is made of steel, and moves in a suitable hole in the frame A. The end of this plunger is beveled, as shown, to conform to the bevel of the die, and is of the shape shown in Figs. 1 and 2. To prevent the plunger from turning, we make it with a flattened surface, as shown at $d$, against which works the screw $a^2$. The plunger is provided with a spring, $d^1$, which is prevented from leaving its place by the pin $d^2$. The object of this spring is to raise the plunger automatically.

The operation of this device is as follows: The gage being properly adjusted, as already mentioned, the saw is placed upon the die, so that the first tooth will be directly under the plunger, which is brought down by a blow from a hammer. The same process is repeated with every alternate tooth; and then the saw is turned over, and the teeth which incline in an opposite direction are adjusted in a similar manner, an operation which can be performed by an unskilled hand.

The surface of the die is formed as shown so as to give a horizontal surface at the front, on which the saw rests.

If the bevel extended from the front, it would form an edge at that point, which would have the effect of cutting the teeth when being set.

To secure the die firmly in place we use suitable wedge pieces.

What we claim as new, and desire to secure by Letters Patent, is—

The construction and combination, jointly, of the stand A, die B, gage C, and plunger D, substantially as described.

In testimony that we claim the above we have hereunto subscribed our names in the presence of two witnesses.

AUGUSTUS B. SMITH.
SAMUEL OSBORN.

Witnesses:
JAMES WOLFENDEN,
JAMES NUGENT.